US005720496A

United States Patent [19]
Riefe et al.

[11] Patent Number: 5,720,496
[45] Date of Patent: Feb. 24, 1998

[54] ENERGY ABSORBER FOR MOTOR VEHICLE STEERING COLUMN

[75] Inventors: Richard Kremer Riefe, Saginaw; Ray Garnet Armstrong, Bay City; Howard David Beauch, Frankenmuth, all of Mich.

[73] Assignee: General Motors Corporation, Detroit, Mich.

[21] Appl. No.: 673,764

[22] Filed: Jun. 17, 1996

[51] Int. Cl.$^6$ .................................................. B62D 1/19
[52] U.S. Cl. .......................... 280/775; 280/777; 188/371; 74/493
[58] Field of Search ............................ 280/777, 775, 280/779, 780; 188/371, 374; 74/493, 492

[56] References Cited

U.S. PATENT DOCUMENTS

| | | | |
|---|---|---|---|
| 4,117,741 | 10/1978 | Yazane et al. | 74/492 |
| 4,838,576 | 6/1989 | Hamasaki et al. | 280/777 |
| 4,989,898 | 2/1991 | Yamaguchi et al. | 280/777 |
| 5,052,716 | 10/1991 | Matsumoto | 280/777 |
| 5,390,956 | 2/1995 | Thomas | 280/777 |

FOREIGN PATENT DOCUMENTS

| | | | |
|---|---|---|---|
| 3-136973 | 6/1991 | Japan | 280/777 |
| 6-206552 | 7/1994 | Japan | 74/493 |
| 1060974 | 3/1967 | United Kingdom | 188/371 |

*Primary Examiner*—Peter C. English
*Attorney, Agent, or Firm*—Saul Schwartz

[57] ABSTRACT

An energy absorber for a motor vehicle steering column including a yoke pivotable about a lateral centerline of a body of the motor vehicle and an energy absorbing mechanism responsive to linear translation of a mast jacket of the steering column relative to the yoke. The mast jacket extends through a bore in the yoke and a plastic bushing in the bore prevents the mast jacket from tipping relative to the yoke. The energy absorbing mechanism includes flat metal strap wound into a spiral coil and cradled or otherwise captured in a flat recess in the yoke tangent to the mast jacket. A distal end of the flat metal strap parallel to the mast jacket is rigidly attached to the latter so that during linear translation of the mast jacket under impact, the distal end is pulled out of the flat recess and unrolls the spiral coil. As the spiral coil unrolls, the flat metal strap is plastically deformed to convert into work a fraction of the kinetic energy of the impact on the steering column.

4 Claims, 3 Drawing Sheets

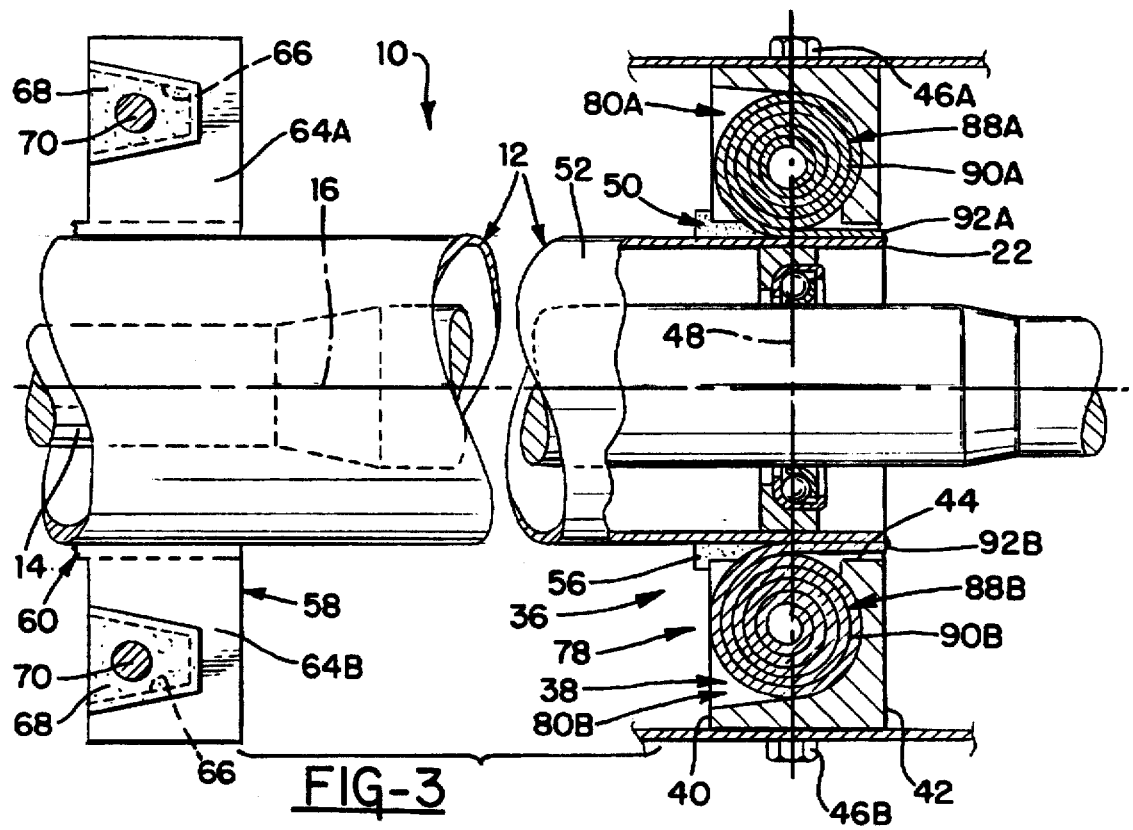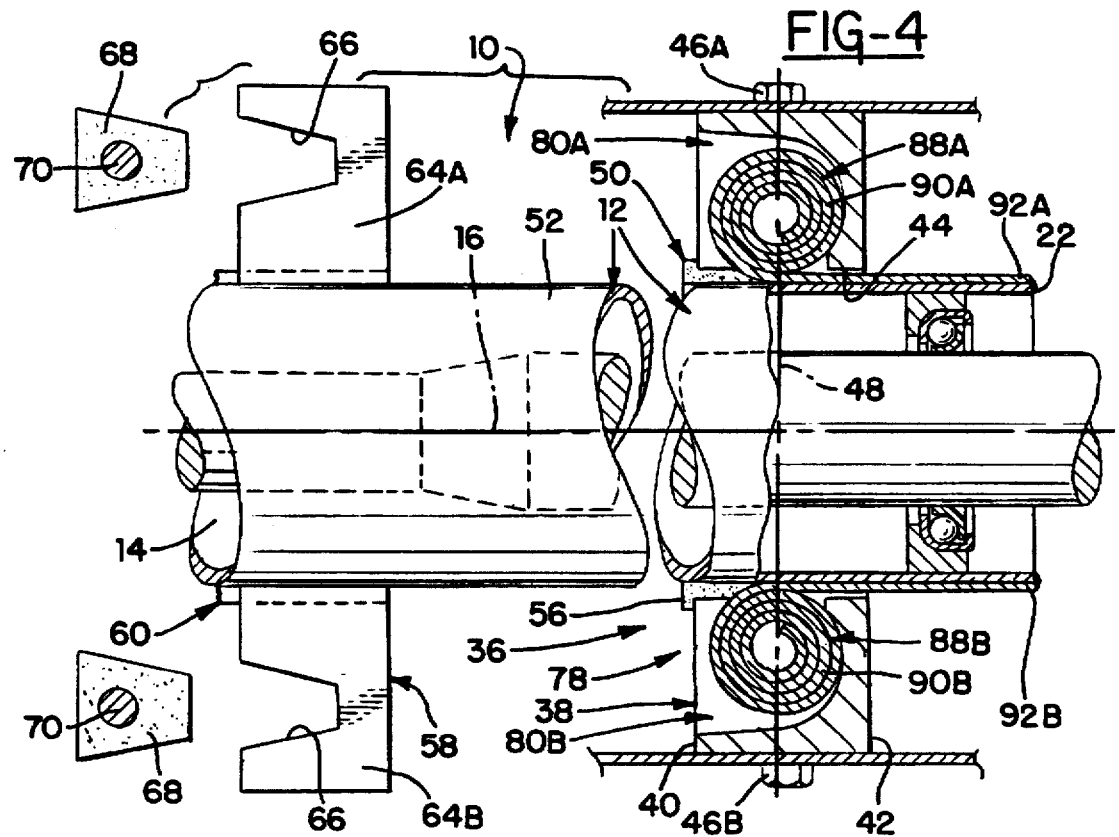

ENERGY ABSORBER FOR MOTOR VEHICLE STEERING COLUMN

FIELD OF THE INVENTION

This invention relates to energy absorbing steering columns for motor vehicles.

BACKGROUND OF THE INVENTION

A known energy absorber of simple construction for a motor vehicle steering column consists of an anvil on the steering column near the upper end thereof and a metal strap bent around the anvil and attached at one end to a body structure of the motor vehicle. During impact initiated linear translation of the steering column through an energy absorbing collapse stroke, the metal strap is plastically deformed as the anvil is pulled along the length of the strap. Plastic deformation of the strap converts into work a fraction of the kinetic energy of the impact. The placement of the energy absorber near the upper end of the steering column, however, consumes space in an already congested environment. Further, optimum energy absorbing performance requires that the metal strap be parallel to the direction of linear translation of the steering column before and during the collapse stroke. It is difficult to maintain such parallelism before a collapse stroke where the steering column is "raked" or "rake adjustable", i.e., pivotable up and down about a centerline at the bottom of the steering column for adjustment of the vertical position of a steering wheel. It is, likewise, difficult to maintain such parallelism during the collapse stroke.

SUMMARY OF THE INVENTION

This invention is a new and improved energy absorber for a motor vehicle steering column including a yoke pivotable about a lateral centerline of a body of the motor vehicle and an energy absorbing means responsive to linear translation of a mast jacket of the steering column relative to the yoke. The mast jacket extends through a bore in the yoke and a plastic bushing in the bore prevents the mast jacket from tipping relative to the yoke. The energy absorbing means includes flat metal strap formed into a spiral coil and cradled or otherwise captured in a flat recess in the yoke tangent to the mast jacket. A distal end of the flat metal strap parallel to the mast jacket is rigidly attached to the latter so that during linear translation of the mast jacket under impact, the spiral coil is unrolled and the flat metal strap concurrently plastically deformed to convert into work a fraction of the kinetic energy of the impact on the steering column.

BRIEF DESCRIPTION OF THE DRAWINGS

FIG. 3 is a partially broken-away view taken generally along the plane indicated by lines 3—3 in FIG. 2;

FIG. 4 is similar to FIG. 3 showing elements of the energy absorber according to this invention in different relative positions;

DESCRIPTION OF A PREFERRED EMBODIMENT

Figure 1:
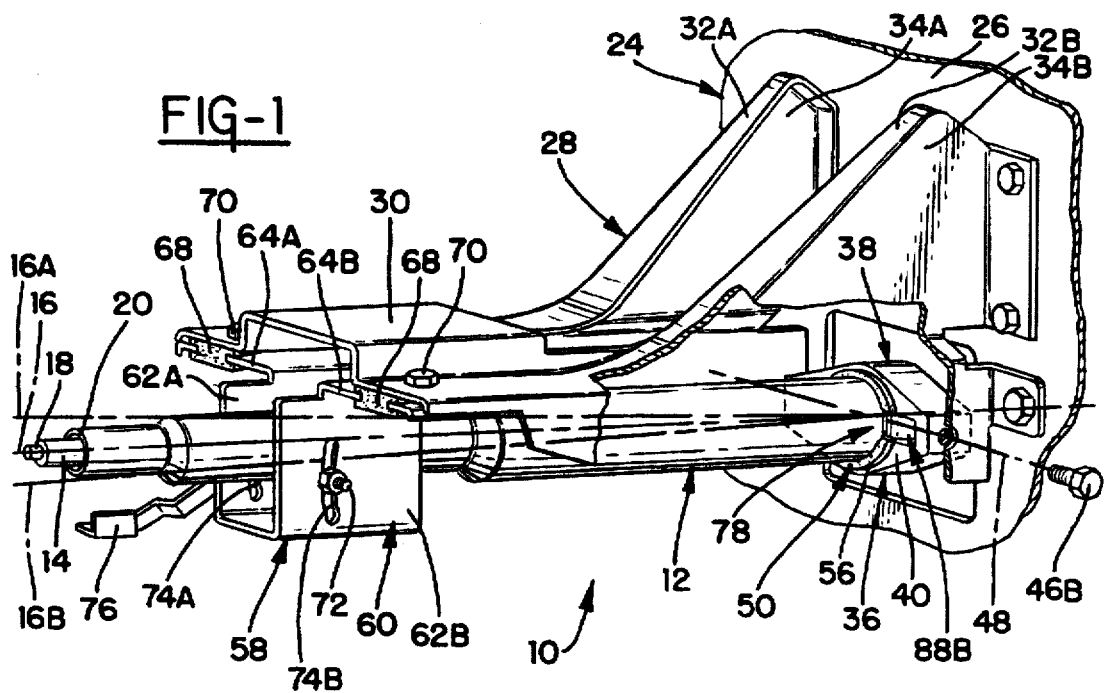
FIG. 1 is a partially broken-away, fragmentary perspective view of a motor vehicle steering column having an energy absorber according to this invention.
Figure 2:
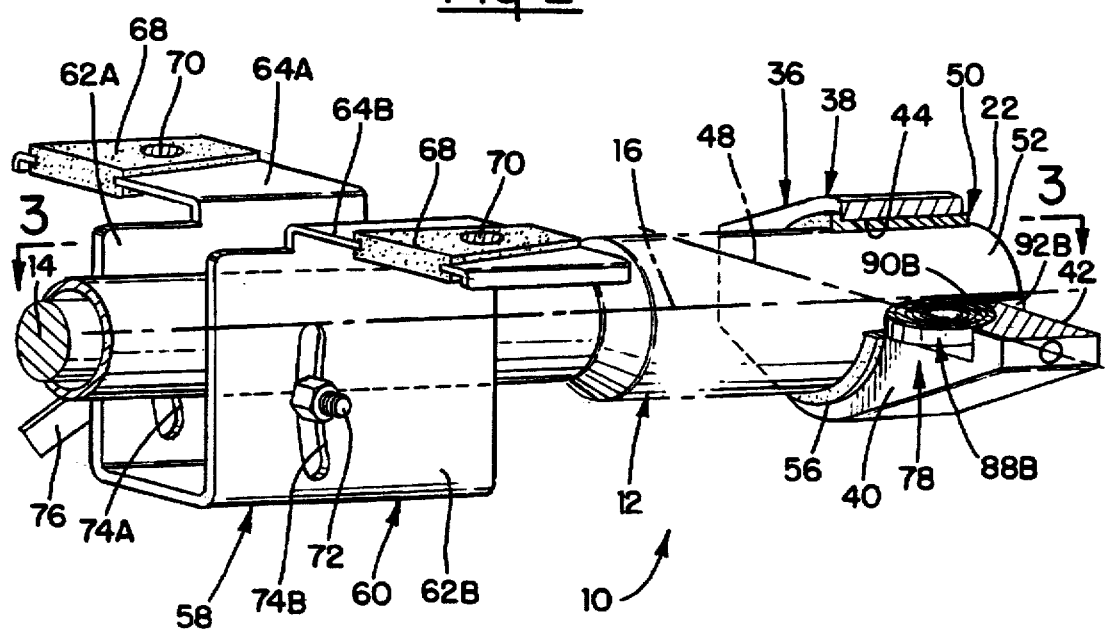
FIG. 2 is an enlarged, partially broken-away view of a portion of FIG. 1.

Referring to FIG. 1, a motor vehicle steering column 10 includes a tubular mast jacket 12 and a steering shaft 14 supported on the mast jacket for rotation about a longitudinal centerline 16 of the steering column and for linear translation as a unit with the mast jacket in the direction of the longitudinal centerline 16. The steering shaft 14 has an upper end 18 protruding beyond an upper end 20 of the mast jacket 12 and a lower end, not shown, protruding beyond a lower end 22, FIGS. 3–4, of the mast jacket 12. A steering wheel, not shown, is rigidly attached to the upper end 18 of the steering shaft.

A fragmentarily illustrated body structure 24, FIG. 1, of the motor vehicle includes a vertical panel 26 at the forward extremity of a passenger compartment of the motor vehicle and a bracket 28 bolted to the vertical panel. The bracket 28 includes a horizontal panel 30 and a pair of integral supports 32A, 32B. The horizontal panel 30 is flanked on opposite sides by a pair of depending vertical sides 34A, 34B of the bracket 28 integral with the horizontal panel and with the supports 32A, 32B, respectively.

An energy absorber 36 according to this invention includes a yoke 38 having a first side 40 facing the upper end of the mast jacket, an opposite second side 42, and a bore 44 between the first and second sides. A pair of bolts 46A, 46B threaded into holes in opposite ends of the yoke through a corresponding pair of apertures in the vertical sides 34A, 34B, respectively, of the bracket 28 define a pair of trunnions supporting the yoke 38 on the body structure 24 for pivotal movement about a lateral centerline 48 of the latter.

Figure 5:
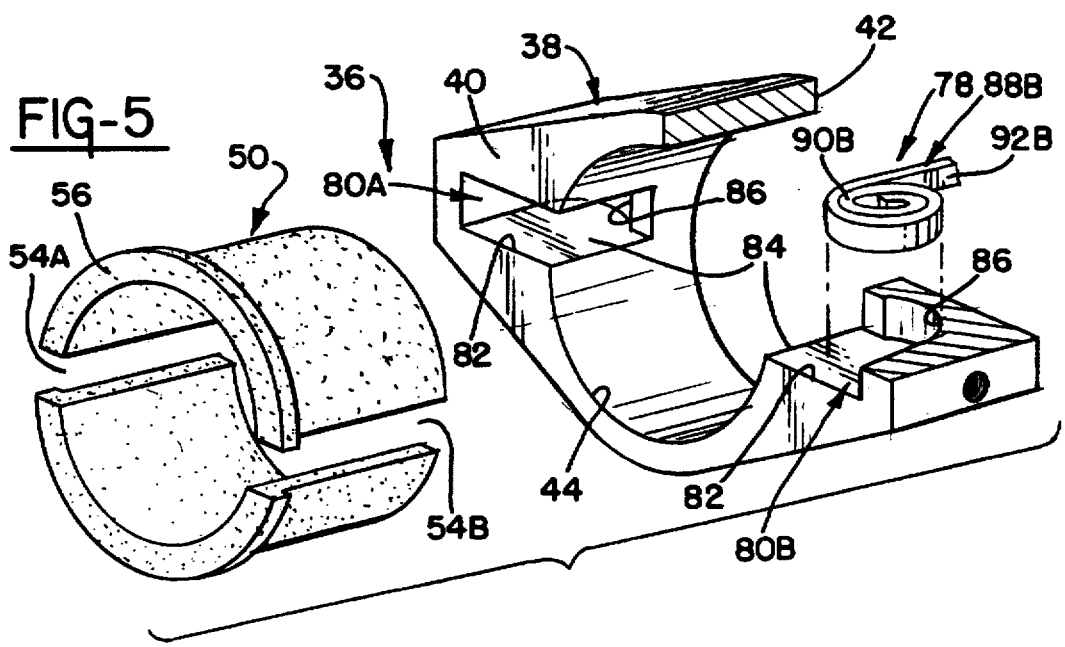
FIG. 5 is a fragmentary, exploded perspective view of the energy absorber according to this invention.

The mast jacket 12 is disposed in the bore 44 in the yoke 38 with the longitudinal centerline 16 of the steering column intersecting the lateral centerline 48. A split, cylindrical plastic bushing 50 fills the annulus between an outside cylindrical wall 52 of the mast jacket 12 and the bore 44 except for a diametrically opposite pair of slots 54A, 54B (FIG. 5) defined between the split segments of the bushing. A lip 56 of the plastic bushing 50 seats against the first side 40 of the yoke to prevent dislodgment of the bushing through the second side 42 of the yoke.

The plastic bushing 50 unites the yoke 38 and the mast jacket 12 for rake adjustment of the steering column 10, i.e., up and down pivotal movement about the lateral centerline 48 at the bottom of the steering column, between upper and lower limit positions represented by positions 16A and 16B of the centerline 16 of the steering column, FIG. 1. The plastic bushing 50 also defines a slide bearing between the mast jacket 12 and the yoke 38 for linear translation of the mast jacket relative to the yoke in the direction of the longitudinal centerline 16. The plastic bushing 50 prevents tipping of the mast jacket in the bore 44 relative to the yoke before and during relative linear translation.

A generic clamp 58 is disposed between the bracket 28 and the mast jacket 12 and includes a box-shaped bracket 60 having a pair of vertical sides 62A, 62B on opposite sides of the mast jacket and a pair of horizontal flanges 64A, 64B extending outward from the vertical sides 62A, 62B, respectively. Each of the flanges 64A, 64B has a notch 66, FIG. 4, open toward the upper end 20 of the mast jacket in which is received a capsule 68. The capsules are retained in the notches 66 by plastic shear pins, not shown, and have openings through which a pair of hanger bolts 70 extend. A nut, not shown, on each hanger bolt 70 clamps the corresponding capsule 68 to the horizontal panel 30 of the bracket 28.

The clamp 58 further includes a cross bolt 72 on the mast jacket 12 projecting through a pair of arc-shaped slots 74A, 74B in the vertical sides 62A, 62B centered about the lateral centerline 48 and a lever 76 which rotates the cross bolt. When the cross bolt 72 is loose between the vertical sides 62A, 62B, the mast jacket 12 is rake adjustable. When the cross bolt 72 is tight between the vertical sides 62A, 62B, the mast jacket 12 is rigidly clamped to the box-shaped bracket 60.

An energy absorbing means 78 of the energy absorber 36 includes a pair of flat recesses 80A, 80B in the yoke 38 on opposite sides of the bore 44 in the plane defined by the intersecting longitudinal and lateral centerlines 16, 48. As seen best in FIG. 5, each of the flat recesses 80A, 80B has an open junction 82 with the first side 40 of the yoke 38 and an open junction 84 with the bore 44 in the yoke in registry with a corresponding one of the slots 54A, 54B defined between the separate segments of the split plastic bushing 50. Each of the flat recesses also has an internal, contoured side 86.

As seen best in FIG. 3, the energy absorbing means 78 further includes a pair of flat metal straps 88A, 88B in the flat recesses 80A, 80B, respectively, formed as a pair of spiral coils 90A, 90B cradled on the contoured sides 86 of the recesses 80A, 80B. The straps 88A, 88B are plastically deformed when wound from flat to spiral coil and, therefore, remain coiled without restraint. The spiral coils 90A, 90B are tangent to the cylindrical outer wall 52 of the mast jacket on diametrically opposite sides of the latter through the junctions 84. A distal end 92A, 92B of each flat metal strap 88A, 88B parallel to the longitudinal centerline 16 of the steering column is spot welded or otherwise rigidly attached to the mast jacket 12 in the slots 54A, 54B defined between the separate segments of the split plastic bushing 50.

An energy absorbing collapse stroke of the steering column 10 commences with an impact toward the vertical panel 26 on the steering wheel on the upper end 18 of the steering shaft 14. Force attributable to the impact is transferred from the steering shaft 14 to the mast jacket 12 through thrust bearings, not shown, and fractures the shear pins between the flanges 64A, 64B and the capsules 68. Concurrently, the impact force induces tension in the distal ends 92A, 92B of the metal straps 88A, 88B which is applied tangentially to the spiral coils 90A, 90B and which pulls the flat metal straps out of the flat recesses 80A, 80B, respectively, parallel to the longitudinal centerline 16 by unrolling the coils 90A, 90B as the mast jacket translates linearly through its collapse stroke, FIG. 4. Plastic deformation of the flat metal straps 88A, 88B which occurs as the spiral coils 90A, 90B unroll converts into work a fraction of the kinetic energy of the impact on the steering wheel.

The energy absorbing performance of the energy absorber 36 can be tailored to achieve specific objectives, such as compensating for the reduction in the outside diameter of the spiral coils 90A, 90B as they unroll, by calculated selection of the physical characteristics, e.g. width and thickness dimensions, of the flat metal straps 88A, 88B. Because the plastic bushing 50 prevents tipping of the mast jacket 12 in bore 44 in the yoke 38, the yoke pivots up and down with the mast jacket about the lateral centerline 48 in accordance with the direction of the impact on the steering wheel so that the flat metal straps 88A, 88B remain parallel to the direction of linear translation of the mast jacket throughout the energy absorbing collapse stroke.

Importantly, the flat metal straps 88A, 88B are each work hardened by plastic deformation in the course of being rolled into the spiral coils 90A, 90B which work hardening contributes to improved energy absorbing performance of the energy absorber 36. Also, when confined within the flat recesses 80A, 80B, the flat metal straps are shielded against accidental damage during transportation and during installation of the steering column 10 on a motor vehicle.

Figure 6:
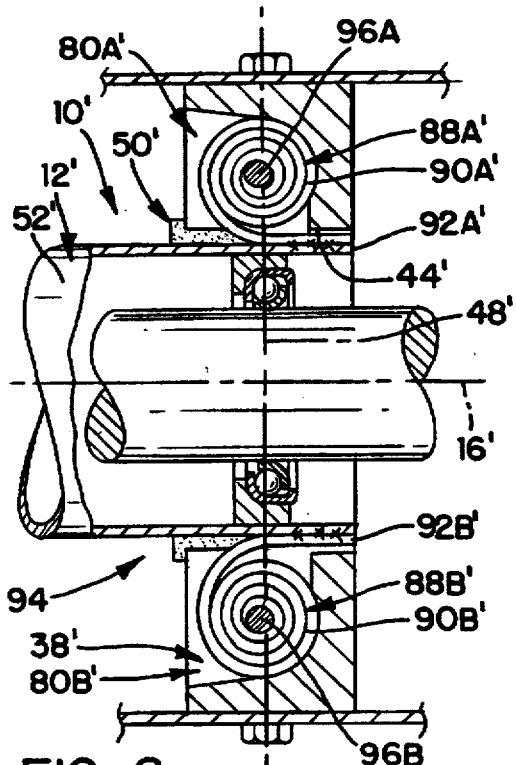
FIG. 6 is a view similar to FIG. 3 showing a modified embodiment of the energy absorber according to this invention.

A modified energy absorber 94 according to this invention is fragmentarily illustrated in FIG. 6. Features of the modified energy absorber 94 corresponding to features of the energy absorber 36 are identified by primed reference characters. The modified energy absorber 94 includes a yoke 38' supported on a motor vehicle body structure, not shown, for pivotal movement about a lateral centerline 48'. A mast jacket 12' of a steering column 10' is disposed in a bore 44' in the yoke 38' with a split plastic bushing 50' filling the annulus between an outside cylindrical wall 52' of the mast jacket 12' and the bore 44'. The plastic bushing 50' prevents tipping of the mast jacket 12' in the bore 44' relative to the yoke 38'. The lateral centerline 48' intersects a longitudinal centerline 16' of the steering column 10'.

The yoke 38' has a pair of flat recesses 80A', 80B' therein in a plane coincident with the plane of the intersecting longitudinal and lateral centerlines 16', 48'. A pair of flat metal straps 88A', 88B' are formed as a pair of spiral coils 90A', 90B' in the flat recesses 80A', 80B', respectively. The straps 88A', 88B' are plastically deformed when wound from flat to spiral coil and, therefore, remain coiled without restraint. The spiral coils 90A', 90B' are tangent to the cylindrical outer wall 52' of the mast jacket on diametrically opposite sides of the latter through open junctions between the bore 44' and the flat recesses 80A', 80B'.

A distal end 92A', 92B' of each metal strap 88A', 88B' parallel to the longitudinal centerline 16' of the steering column is spot welded or otherwise rigidly attached to the mast jacket 12' in slots defined between separate segments of the split plastic bushing 50'. Respective ones of a pair of rigid pins 96A, 96B on the yoke 38' project across the flat recesses 80A', 80B' and through the geometric centers of the spiral coils 90A', 90B' so that the spiral coils unroll around the pins.

In an energy absorbing collapse stroke of the steering column 10', an impact force on the mast jacket induces tension in the distal ends 92A', 92B' of the metal straps 88A', 88B' which is applied tangentially to the spiral coils 90A', 90B' and which pulls the flat metal straps out of the flat recesses 80A', 80B', respectively, parallel to the longitudinal centerline 16' by unrolling the coils about the rigid pins 96A, 96B as the mast jacket translates linearly through its collapse stroke. Plastic deformation of the flat metal straps which occurs as the spiral coils 90A', 90B' unroll converts into work a fraction of the kinetic energy of the impact on the steering wheel.

What is claimed is:

1. An energy absorber for a motor vehicle steering column having a mast jacket with a longitudinal centerline coincident with a longitudinal centerline of said steering column, characterized in that said energy absorber comprises:

a yoke having a bore therethrough mounted on a body structure of said motor vehicle for pivotal movement about a lateral centerline of said body structure, a bushing means operative to support said mast jacket in said bore in said yoke with said longitudinal centerline of said mast jacket intersecting said lateral centerline for linear translation in the direction of said longitudinal centerline of said mast jacket and for pivotal movement as a unit with said yoke about said lateral centerline, a flat recess in said yoke in a plane defined by said longitudinal centerline of said mast jacket and said lateral centerline having an open junction with said bore in said yoke, a flat metal strap in said flat recess plastically deformed into a spiral coil having a distal end tangent to said mast jacket through said junction and parallel to said longitudinal centerline of said mast jacket, means operative to rigidly attach said distal end of said flat metal strap to said mast jacket, and means operative to confine said spiral coil in said flat recess during linear translation of said mast jacket in the direction of said longitudinal centerline thereof in response to an impact on said steering column so that said flat metal strap unrolls from said spiral coil through said junction with concurrent plastic deformation to convert into work a fraction of the kinetic energy of said impact on said steering column.

2. The energy absorber recited in claim 1 further comprising:

a second flat recess in said yoke in the plane defined by said longitudinal centerline of said mast jacket and said lateral centerline having a second open junction with said bore in said yoke, a second flat metal strap in said second flat recess plastically deformed into a second spiral coil having a distal end tangent to said mast jacket through said second junction and parallel to said longitudinal centerline of said mast jacket, means operative to rigidly attach said distal end of said second flat metal strap to said mast jacket, and means operative to confine said second spiral coil in said second flat recess during linear translation of said mast jacket in the direction of said longitudinal centerline thereof in response to an impact on said steering column so that said second flat metal strap unrolls from said second spiral coil through said second junction parallel to said longitudinal centerline of said mast jacket with concurrent plastic deformation to convert into work a fraction of the kinetic energy of said impact on said steering column.

3. The energy absorber recited in claim 2 wherein said means operative to confine said spiral coils in said flat recesses during linear translation of said mast jacket in the direction of said longitudinal centerline thereof comprises:

a contoured side of each of said flat recesses defining a cradle for the corresponding one of said spiral coils.

4. The energy absorber recited in claim 2 wherein said means operative to confine said spiral coils in said flat recesses during linear translation of said mast jacket in the direction of said longitudinal centerline thereof comprises:

a pair of rigid pins on said yoke extending through respective ones of the geometric centers of said spiral coils.

* * * * *